May 26, 1925.  
J. W. MURPHY  
1,539,688  
WELDED LOCOMOTIVE TENDERS  
Filed March 22, 1922  2 Sheets-Sheet 1
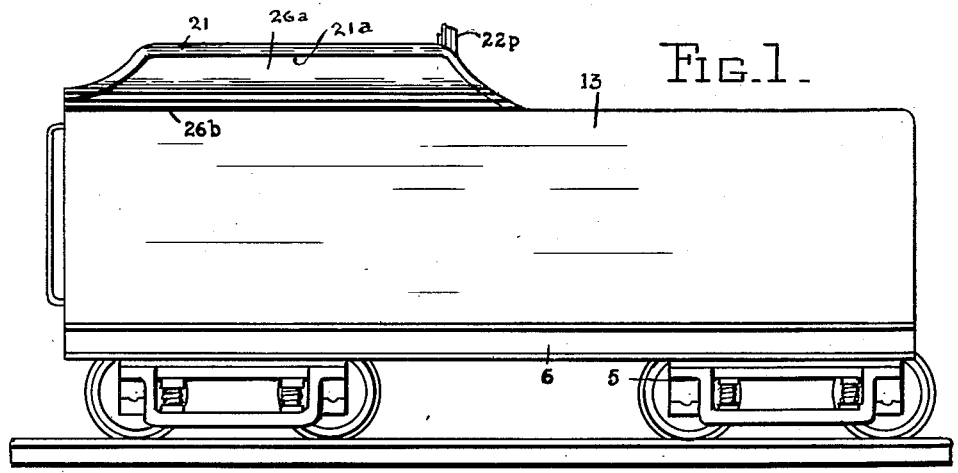
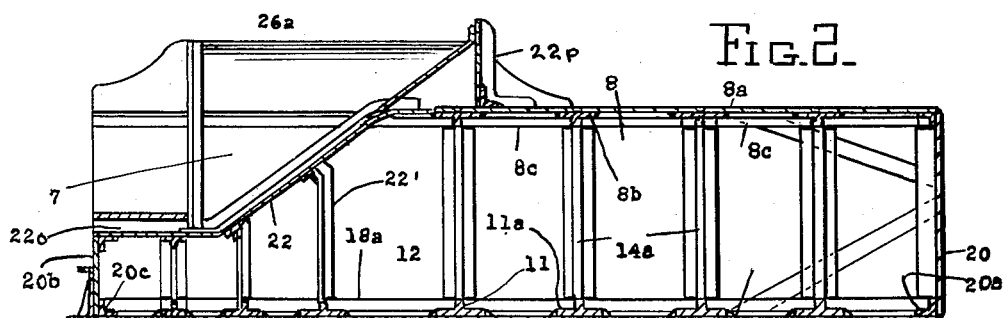
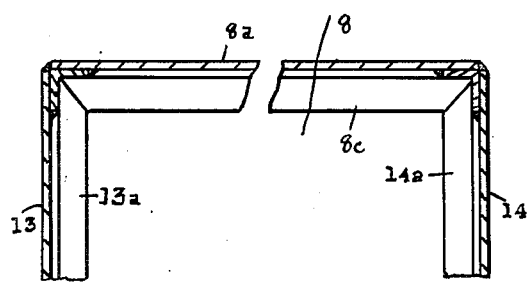
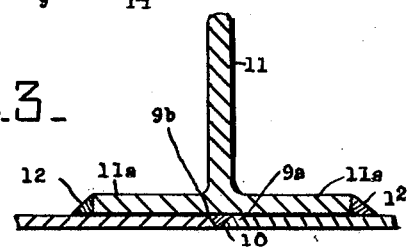
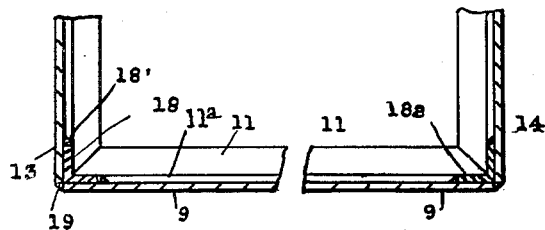
INVENTOR.  
J. W. MURPHY  
BY Joseph J. O'Brien  
ATTORNEY.

May 26, 1925. 1,539,688
J. W. MURPHY
WELDED LOCOMOTIVE TENDER
Filed March 22, 1922 2 Sheets-Sheet 2

INVENTOR
J. W. MURPHY
Joseph J. O'Brien
ATTORNEY

Patented May 26, 1925.

1,539,688

UNITED STATES PATENT OFFICE.

JOSEPH WILLIAM MURPHY, OF SPRINGFIELD, MASSACHUSETTS.

WELDED LOCOMOTIVE TENDER.

Application filed March 22, 1922. Serial No. 545,811.

*To all whom it may concern:*

Be it known that JOSEPH W. MURPHY, a citizen of the United States of America, residing at Springfield, in the county of Hampden and State of Massachusetts, has invented certain new and useful Improvements in Welded Locomotive Tenders, of which the following is a specification.

This invention relates to improvements in locomotive tender tanks and its leading object is to provide a tank construction which will resist wear and structural changes, due to vibration and the washing action of water in the water tank, and which can be manufactured more economically than the present all riveted tank.

In the present locomotive tender construction T-bars are arranged across the bottom wall of the water tank and secured by rivets which are extended through said T-bar and bottom wall. The water is caused to wash back and forth over these T-bars due to the rolling action of the tender and its starting and stopping. This washing action causes small channels to be cut between the T-bars and the bottom wall of the tank, through the steel, and leakages are soon started. I find that this condition arises from the fact that the T-bars cannot be forced into absolutely water tight contact with the bottom wall, so that small spaces are left between the T-bars and the bottom wall, which the washing action of the contained water, together with sediment accumulated in the bottom of the water tank, gradually enlarges, by what is generally termed scouring, and the wall is finally broken through.

In the tender construction which I have invented this gradual destruction of the bottom wall, as well as the side and end walls is avoided, by forming an absolute water tight contact between the cross bars and the engaged wall, and by dispensing with rivets and using special welded joints between the contacting parts.

With the above and other objects in view the invention consists in certain new and useful constructions and arrangements of parts, clearly described in the following specification and fully illustrated in the accompanying drawings, in which:

Fig. 1 is a side elevation of a completed tender.

Fig. 2 is a vertical longitudinal sectional view thereof, with the trucks removed.

Fig. 3 is a detail cross sectional view, on an enlarged scale, showing the welded joint between the side and bottom walls and the reinforcing angle iron.

Fig. 4 is a detail vertical sectional view on an enlarged scale of a T-bar and the joint between adjacent base plates.

Referring to the accompanying drawings illustrating the practical embodiment of my invention 5 designates standard trucks on which the superstructure 6 is mounted. This superstructure consists of the coal bin 7 and the water tank 8. The water tank 8 includes the major body portion of the superstructure, and the coal bin is located at one end and over the water tank, as in the usual practice.

Figure 7:
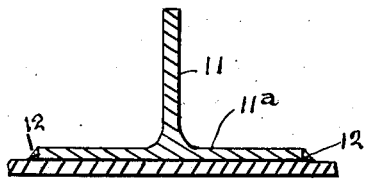
Fig. 7 is another similar view showing the joint between one of the T-bars and the wall on which it is mounted.

The bottom wall 9 is made up of flat steel plates, which are provided with confronting bevelled edges $9^a$, which edges are arranged so as to diverge upwardly, thus forming a relatively wide V-shaped space or recess $9^b$, in which the welding metal 10 is disposed by a suitable welding operation, so as to completely fill the recess or space $9^b$. Across the bottom, thus composed, a series of T-bars 11 are disposed; these bars being longitudinally spaced apart and arranged in parallel transverse relation, with the wider flange $11^a$ of each bar in contacting engagement with the bottom wall 9. The sides of the base bar or flange $11^a$ are not bevelled but are squared and welding metal 12 is disposed by a welding operation against the vertical edges of the flange $11^a$ and on the bottom wall adjacent said edges, so as to provide a triangular union between said flange $11^a$ and the bottom wall, as shown in Figs. 4 and 7. This triangular weld provides a sloping face for the bottom wall along the edge of the base flange of the T-bar 11, so that scouring action of the water contained in the tank is reduced to a minimum or largely eliminated. Since this water accumulates sediment and gritty substances and is agitated during the rolling of the tender the erosion of the bottom by the motion of the tank water is practically eliminated, thus greatly prolonging the effective life of the tender.

The side walls 13 and 14 are constructed of a series of plates united to each other by welding metal in the manner described with reference to the plates composing the bottom wall. In Fig. 2 I show the arrangement of the side wall 14, which is provided with a series of vertically disposed T-bars 14$^a$, held by triangular welding joints, similar to the manner in which the bars 11 are held.

Figure 5:
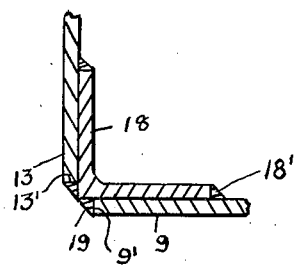
Fig. 5 is detail vertical sectional view on an enlarged scale showing the joint between the base wall and the side wall, and the angle bar reinforcement.

The side walls are welded to the bottom wall by means of the welding joint shown in Figs. 3 and 5. The bottom wall 9 is formed with a squared outer or longitudinal edge 9′ and the side wall 13 is formed with a similar lower longitudinal edge 13′, which are slightly spaced apart to receive the corner portion of the angle bar 18, which has its outer sides disposed in contacting engagement with the inner surfaces of the wall 13 and the wall 9. The corner portion of the angle bar 18 is welded to the longitudinal edge portions of the side wall 15 and the bottom wall 9 by means of the welding metal 19. The longitudinal edge portions of the angle bar 18 are welded to the inner faces of the bottom wall 9 and the side wall 13 by means of the welding metal 18′. The side wall 14 is similarly united to the bottom wall 9, by means of the angle bar 18$^a$, shown in Fig. 2.

The forward end wall 20 is welded to the angle bar 20$^a$, which is welded to the bottom wall 9, in the manner shown in Fig. 5. The rear end wall 20$^b$ is welded to the angle bar 20$^c$ which is welded to the bottom wall 9, in the manner shown in Fig. 5.

The top wall 8$^a$ is constructed like the bottom wall 9, and is reinforced by transverse T-bars 8$^b$, which are welded thereto in the manner described with reference to the T-bars 11. The top wall 8$^a$ is welded to the longitudinal angle bars 8$^c$ in the manner described with reference to Fig. 5.

The floor 22 of the coal bin 7 is supported in an inclined position upon the vertically disposed angle bars 22′, and a portion 22″ of said floor extends rearwardly in the usual manner to provide a delivery opening 22$^o$. The upper end of the inclined wall or floor 22 is welded to the riser or angle bracket 22$^p$, which is mounted on the top wall 8$^a$ and welded thereto.

Figure 6:
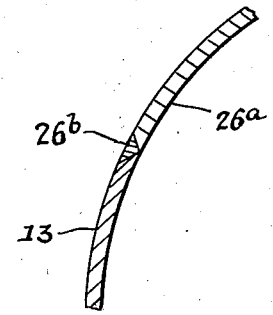
Fig. 6 is a similar view showing the joint between the side wall and the Dickey plate.
Figure 8:
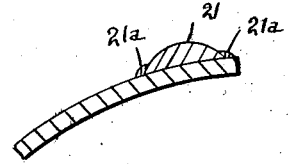
Fig. 8 is another similar view showing the beading strip of the Dickey plate and its joint.

To the upper edge portions of the side walls the Dickey plates 26$^a$ are welded by the welding joint 26$^b$, shown in Fig. 6. These Dickey plates are provided with beading strips 21, which are welded thereto by means of the welds 21$^a$, shown in Fig. 8.

Figure 9:
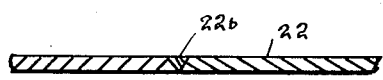
Fig. 9 is another similar view showing the joint between adjacent plates of the floor of the coal bin.

The weld 22$^b$ forms a means for securing together the plates forming the floor 22 of the coal bin, shown in Fig. 9.

Having described my invention I claim :—

1. A locomotive tender having its bottom, side and end walls constructed of parts welded to each other, each of the walls being reinforced interiorly by angle beams welded to said walls, the welded joints between the angle beams and the walls providing inclined surfaces capable of excluding all water and thus preventing a scouring action of the water of the tender between the angle beams and the engaged walls.

2. A locomotive tender including a water tank and a coal bin, the tank and bin being constructed of parts welded to each other to provide a body held together without the use of penetrating rivets, the side walls and the corner joints of the tank being reinforced by angle beams, the angle beams of the corner joints being joined to the side walls by welds connecting the angle beams to the end edge portions of the side walls, and the side flanges of the angle beams being welded to the adjacent side walls by welds providing sloping surfaces adapted to form water tight joints and completely exclude the flow of water therebetween, whereby scouring and erosion is avoided at the joints.

Signed by me at Springfield, Mass.

JOSEPH WILLIAM MURPHY.